(12) United States Patent
Coscarella (10) Patent No.: US 10,018,287 B2
(45) Date of Patent: *Jul. 10, 2018

(54) WEATHER BARRIER FOR A BUILDING PENETRATION

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,778

(22) Filed: Jul. 9, 2015

(65) Prior Publication Data

US 2015/0323103 A1 Nov. 12, 2015

Related U.S. Application Data

(63) Continuation-in-part of application No. 14/613,056, filed on Feb. 3, 2015, now Pat. No. 9,140,002, which
(Continued)

(30) Foreign Application Priority Data

Oct. 21, 2014 (CA) ..................................... 2868595

(51) Int. Cl.
*E04B 1/66* (2006.01)
*H02G 3/22* (2006.01)
(Continued)

(52) U.S. Cl.
CPC ................ *F16L 5/10* (2013.01); *B32B 3/266* (2013.01); *E04B 1/625* (2013.01); *E04B 1/665* (2013.01);
(Continued)

(58) Field of Classification Search
CPC .... F16L 5/02; F16L 5/10; B32B 3/266; B32B 2581/00; E04B 1/665; E04B 1/6803;
(Continued)

(56) References Cited

U.S. PATENT DOCUMENTS 1,249,892 A * 12/1917 Bropson ............. E04D 13/1476
285/43
2,407,023 A 9/1946 Lockwood
(Continued)

FOREIGN PATENT DOCUMENTS

DE 41 31 637 A1 * 4/1992
DE 29800679 U1 * 7/1998
(Continued)

*Primary Examiner* — Robert Canfield
(74) *Attorney, Agent, or Firm* — Christensen O'Connor Johnson Kindness PLLC (57) ABSTRACT

There is provided a weather barrier for an opening in a wall of a building and a utility that passes through the opening. The weather barrier has a sheet of flexible and water resistant non-elastic material, which has an outer perimeter and an inner perimeter that defines a central passage that is larger than an outer diameter of the utility. A sheet of elastomeric material is sealably attached to the sheet of non-elastic material at the inner perimeter. The sheet of elastomeric material extends inward from the inner perimeter and defines a central opening that is smaller than the outer diameter of the utility. When the sheets of non-elastic and elastomeric material are disposed in a flat position, the sheet of non-elastic material defines a plane and the sheet of elastomeric material is parallel to and in line with the plane of the sheet of non-elastic material.

10 Claims, 10 Drawing Sheets

Related U.S. Application Data is a continuation-in-part of application No. 14/194,331, filed on Feb. 28, 2014, now Pat. No. 9,109,359.

(51) Int. Cl.
*F16L 5/10* (2006.01)
*E04B 1/62* (2006.01)
*E04B 1/68* (2006.01)
*B32B 3/26* (2006.01)

(52) U.S. Cl.
CPC ............ *E04B 1/6803* (2013.01); *H02G 3/22* (2013.01); *B32B 2581/00* (2013.01); *Y10T 29/53* (2015.01); *Y10T 428/24273* (2015.01)

(58) Field of Classification Search
CPC .... H02G 3/22; E04D 3/38; E04D 5/12; E04D 13/1407
USPC .......................... 52/58, 60, 219, 220.8, 408
See application file for complete search history.

(56) References Cited

U.S. PATENT DOCUMENTS

| | | | |
|---|---|---|---|
| 2,985,465 A | 5/1961 | Church | |
| 3,591,190 A | 7/1971 | Winay et al. | |
| 3,787,061 A | 1/1974 | Yoakum | |
| 3,809,350 A * | 5/1974 | Lane | F16L 5/00 138/106 |
| 3,881,752 A | 5/1975 | Fujishima | |
| 3,913,928 A | 10/1975 | Yamaguchi | |
| 4,087,624 A | 5/1978 | Hitchcock | |
| 4,162,347 A | 7/1979 | Montgomery | |
| 4,265,058 A | 5/1981 | Logsdon | |
| 4,293,138 A | 10/1981 | Swantee | |
| 4,296,870 A | 10/1981 | Balkwill et al. | |
| 4,350,351 A | 9/1982 | Martin | |
| 4,385,777 A | 5/1983 | Logsdon | |
| 4,386,488 A * | 6/1983 | Gibbs | E04D 13/1407 454/367 |
| 4,482,161 A | 11/1984 | Izzi, Sr. | |
| 4,526,407 A | 7/1985 | Kifer | |
| 4,548,853 A * | 10/1985 | Bryan | F16L 5/04 428/131 |
| 4,563,847 A | 1/1986 | Hasty | |
| 4,794,207 A | 12/1988 | Norberg et al. | |
| 4,903,997 A | 2/1990 | Kifer | |
| 4,905,940 A | 3/1990 | Luka | |
| 4,927,039 A | 5/1990 | McNab | |
| 4,952,754 A | 8/1990 | Rye | |
| 5,010,700 A * | 4/1991 | Blair | E04D 13/1476 285/42 |
| 5,133,165 A | 7/1992 | Wimberly | |
| 5,226,263 A | 7/1993 | Merrin et al. | |
| 5,237,789 A | 8/1993 | Thaler | |
| 5,248,154 A | 9/1993 | Westhoff et al. | |
| 5,287,665 A * | 2/1994 | Rath, Jr. | H02G 3/126 220/3.3 |
| 5,347,776 A | 9/1994 | Skoff | |
| 5,501,472 A | 3/1996 | Brancher et al. | |
| 5,557,078 A * | 9/1996 | Holwerda | B60R 13/0846 181/208 |
| 5,829,214 A | 11/1998 | Hart | |
| 5,860,256 A | 1/1999 | Humber | |
| 5,944,361 A | 8/1999 | Bravo | |
| 6,161,589 A * | 12/2000 | Bolotte | F16L 5/02 138/106 |
| 6,185,885 B1 | 2/2001 | Thaler | |
| 6,239,365 B1 * | 5/2001 | McEvers | H02G 3/088 174/50 |
| 6,315,849 B1 | 11/2001 | Ross | |
| 6,395,984 B1 | 5/2002 | Gilleran | |
| 6,417,447 B1 | 7/2002 | Bosse, Jr. | |
| 6,494,463 B1 | 12/2002 | Rank | |
| 6,543,186 B2 * | 4/2003 | Gilleran | E03B 7/09 285/39 |
| 6,596,938 B2 | 7/2003 | Gilleran | |
| 6,649,835 B2 | 11/2003 | Gilleran | |
| 6,860,070 B2 | 3/2005 | Gilleran | |
| 6,862,852 B1 | 3/2005 | Beele | |
| 7,176,377 B2 | 2/2007 | Gretz | |
| 7,192,219 B2 | 3/2007 | Graziosi | |
| 7,319,192 B1 | 1/2008 | Gretz | |
| 7,435,900 B1 | 10/2008 | Gretz | |
| 7,568,314 B2 | 8/2009 | Collins | |
| 7,637,385 B2 | 12/2009 | Wegner et al. | |
| 7,645,937 B2 | 1/2010 | Bhosale | |
| 7,674,974 B1 | 3/2010 | Shotey et al. | |
| 7,789,257 B2 | 9/2010 | Davis | |
| 7,802,798 B2 | 9/2010 | Beele | |
| 7,918,066 B1 | 4/2011 | Bauer | |
| 8,079,599 B2 | 12/2011 | Meyers | |
| 8,156,700 B2 | 4/2012 | Umlor | |
| 8,490,353 B2 | 7/2013 | Beele | |
| 8,833,014 B2 | 9/2014 | Beele | |
| 8,933,331 B1 | 1/2015 | Gretz | |
| 9,016,017 B2 * | 4/2015 | Ryden | E04B 1/625 52/220.8 |
| 2001/0052564 A1 | 12/2001 | Karlinger | |
| 2003/0019163 A1 | 1/2003 | Dittel | |
| 2003/0037942 A1 * | 2/2003 | Haselby | H01R 13/65802 174/382 |
| 2004/0045233 A1 | 3/2004 | Beele | |
| 2005/0042403 A1 * | 2/2005 | Boge | C09J 7/02 428/40.1 |
| 2005/0055889 A1 | 3/2005 | Thaler | |
| 2006/0027388 A1 * | 2/2006 | Collins | H02G 3/22 174/663 |
| 2007/0245894 A1 * | 10/2007 | Poulis | E02D 31/008 96/4 |
| 2008/0085336 A1 * | 4/2008 | Mayle | B29B 13/025 425/398 |
| 2008/0124506 A1 | 5/2008 | Boge et al. | |
| 2008/0157518 A1 * | 7/2008 | Cecilio | E02D 31/02 285/42 |
| 2009/0152820 A1 | 6/2009 | Meyers | |
| 2010/0059941 A1 | 3/2010 | Beele | |
| 2011/0056743 A1 | 3/2011 | Solan | |
| 2012/0090263 A1 | 4/2012 | Schaefer | |
| 2013/0231042 A1 * | 9/2013 | Coscarella | F24F 7/00 454/339 |
| 2013/0234404 A1 * | 9/2013 | Coscarella | F16L 5/02 277/606 |
| 2014/0021688 A1 | 1/2014 | Hattori et al. | |
| 2014/0159359 A1 * | 6/2014 | Beall | E04D 13/1407 285/42 |
| 2014/0202758 A1 | 7/2014 | Lolachi | |
| 2014/0232106 A1 * | 8/2014 | Mukai | F16L 5/14 285/194 |
| 2014/0260044 A1 * | 9/2014 | Gilleran | F16L 5/10 52/506.1 |

FOREIGN PATENT DOCUMENTS

| | | | |
|---|---|---|---|
| DE | 20 2012 101 447 U1 * | 9/2012 | |
| DE | 20 2013 100 908 U1 * | 8/2013 | |
| EP | 0161557 A2 | 11/1985 | |
| EP | 2063163 A1 * | 5/2009 | |
| EP | 2703703 A1 * | 3/2014 | |

* cited by examiner

WEATHER BARRIER FOR A BUILDING PENETRATION

TECHNICAL FIELD

This relates to a seal for a building penetration that helps maintain the integrity of the building envelope.

BACKGROUND

New construction, such as residential homes, often requires a building envelope made from a weatherproofing material, such as Tyvek™ or other water resistant, breathable, flexible materials that that are placed on the outer walls of the building.

SUMMARY

According to an aspect, there is provided a weather barrier for a penetration in a building, the penetration comprising an opening in a wall of the building and a utility that passes through the opening, the weather barrier comprising a sheet of non-elastic material, the non-elastic material being flexible and water resistant, the sheet of non-elastic material having an outer perimeter and an inner perimeter, the inner perimeter defining a central passage that is larger than an outer diameter of the utility and a sheet of elastomeric material sealably attached to the sheet of non-elastic material at the inner perimeter, the sheet of elastomeric material extending inward from the inner perimeter and defining a central opening that is smaller than the outer diameter of the utility, wherein, when the sheets of non-elastic and elastomeric material are disposed in a flat position, the sheet of non-elastic material defines a plane and the sheet of elastomeric material is parallel to and in line with the plane of the sheet of non-elastic material.

According to another aspect, the sheet of elastomeric material may be molded to the sheet of non-elastic material.

According to another aspect, the sheet of elastomeric material may have a uniform thickness within the central passage.

According to another aspect, the sheet of non-elastic material may be air permeable.

According to another aspect, the sheet of non-elastic material may comprise a self-adhesive layer.

According to another aspect, the self-adhesive layer may be protected by a removable cover.

According to another aspect, the self-adhesive layer may have a first area that adheres to the sheet of elastomeric material and the remainder of the self-adhesive layer is protected by a removable cover.

According to an aspect, there is provided a method of protecting a penetration in a building against weather, the penetration comprising an opening in a wall of the building and a utility that passes through the opening, the method comprising the steps of providing a sheet of non-elastic material, the non-elastic material being flexible and water resistant, the sheet of non-elastic material having an outer perimeter and an inner perimeter, the inner perimeter defining a central passage that is larger than an outer diameter of the utility and a sheet of elastomeric material sealably attached to the sheet of non-elastic material at the inner perimeter, the sheet of elastic material extending inward from the inner perimeter and defining a central opening that is smaller than the outer diameter of the utility, wherein, when the sheets of non-elastic and elastomeric material are disposed in a flat position, the sheet of non-elastic material defines a plane and the sheet of elastomeric material is parallel to and in line with the plane of the sheet of non-elastic material, and placing the sheet of elastomeric material over the utility such that the central opening of the sheet of elastomeric material stretches around and conforms to the outer diameter of the utility and such that the sheet of non-elastic material is adjacent to the wall of the building, and attaching a building wrap material and the sheet of non-elastic material on the wall of the building.

According to another aspect, the sheet of elastomeric material may be molded to the sheet of non-elastic material.

According to another aspect, the sheet of elastomeric material may have a uniform thickness within the central passage.

According to another aspect, the central opening may be formed by an installer prior to the installer placing the sheet of elastomeric material over the utility.

According to another aspect, the sheet of non-elastic material may be air permeable.

According to another aspect, attaching a building wrap material and the sheet of non-elastic material may comprise attaching in an overlapping fashion.

According to another aspect, the sheet of non-elastic material may comprise a self-adhesive layer having a building-adhering area protected by a removable cover and a cover-adhering area.

According to another aspect, attaching a building wrap material and the sheet of non-elastic material may comprise attaching the self-adhesive layer to the building wrap material and at least one of the wall and the protrusion such that a seal is formed between the building wrap material and the protrusion.

According to another aspect, the cover-adhering area may be protected by a second removable cover, and the method may further comprise the step of removing the second removable cover and adhering the sheet of elastomeric material to the cover-adhering area.

According to an aspect, there is provided a weather barrier for a penetration in a building, the penetration comprising an opening in a wall of the building and a utility that passes through the opening, the weather barrier comprising a sheet of material that is flexible and water resistant, the sheet of material having an outer perimeter and an inner perimeter, the inner perimeter defining a central passage that is larger than an outer diameter of the utility, and a utility cover sealably attached to the sheet of non-elastic material at the inner perimeter, the utility cover extending outward from the inner perimeter in a direction that is perpendicular to the plane of the sheet of non-elastic material and defining a central opening, wherein the utility cover comprises a sleeve that is shaped to receive the outer diameter of the utility.

According to another aspect, the sheet of material may be non-elastic and air permeable.

According to another aspect, the sheet of material may comprise a self-adhesive layer.

According to an aspect, there is provided a weather barrier for a penetration in a building, the penetration comprising an opening in a wall of the building and a utility that passes through the opening, the weather barrier comprising a sheet of material that is flexible and water resistant, the sheet of material having an outer perimeter and an inner perimeter, the inner perimeter defining a central passage that is larger than an outer diameter of the utility, a self-adhesive layer on a face of the sheet of material, the self-adhesive layer having a building-adhering area protected by a removable cover and a cover-adhering area, and a penetration cover that is sealably adhered to the cover-adhering area, the penetration cover extending inward from the inner perimeter and defining a central opening that is sized to receive a building penetration.

According to another aspect, the sheet of material may be a sheet of non-elastic material.

According to another aspect, the sheet of material may comprise an attachment surface on the face of the sheet of material that is opposite the self-adhesive layer, the attachment surface being suitable for receiving tape.

According to an aspect, there is provided a kit for forming a weather barrier for a penetration in a building, the penetration comprising an opening in a wall of the building and a utility that passes through the opening, the kit for forming a weather barrier comprising a sheet of material that is flexible and water resistant, the sheet of material having an outer perimeter and an inner perimeter, the inner perimeter defining a central passage that is larger than an outer diameter of the utility, a self-adhesive layer on a face of the sheet of material, the self-adhesive layer having a building-adhering area protected by a first removable cover and a cover-adhering area protected by a second removable cover and surrounded by the building-adhering area, and a penetration cover for sealably adhering to the cover-adhering area after removal of the second removable cover, the penetration cover being shaped to extend inwardly from the inner perimeter of the sheet of material and to define a central opening that is sized to receive a building penetration when adhered to the cover-adhering area.

Other aspects will be apparent from the description and drawings. The various aspects may be combined or substituted in any reasonable combination.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A weather barrier for a building penetration, generally identified by reference numeral 10, will now be described with reference to FIGS. 1 through 11.

Figure 1:
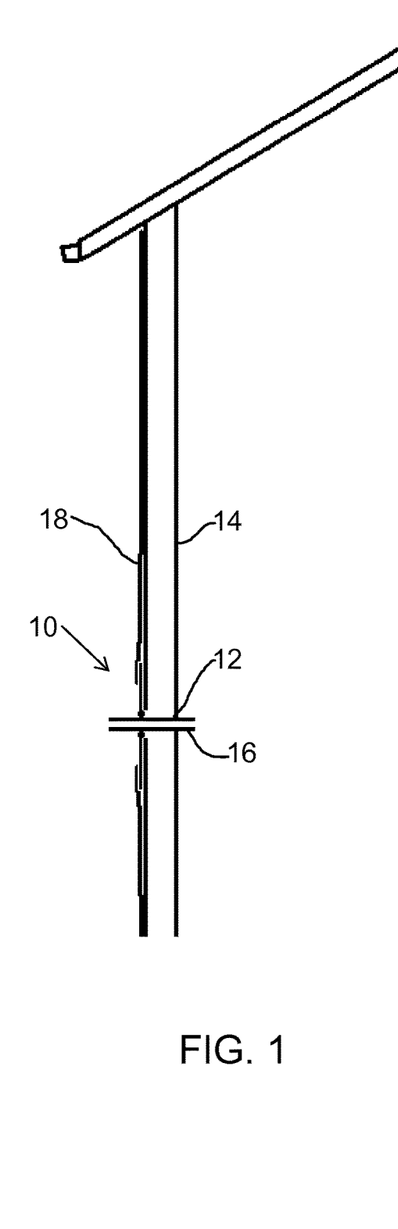
FIG. 1 is a side elevation view in section of a building with a weather barrier.
Figure 2:
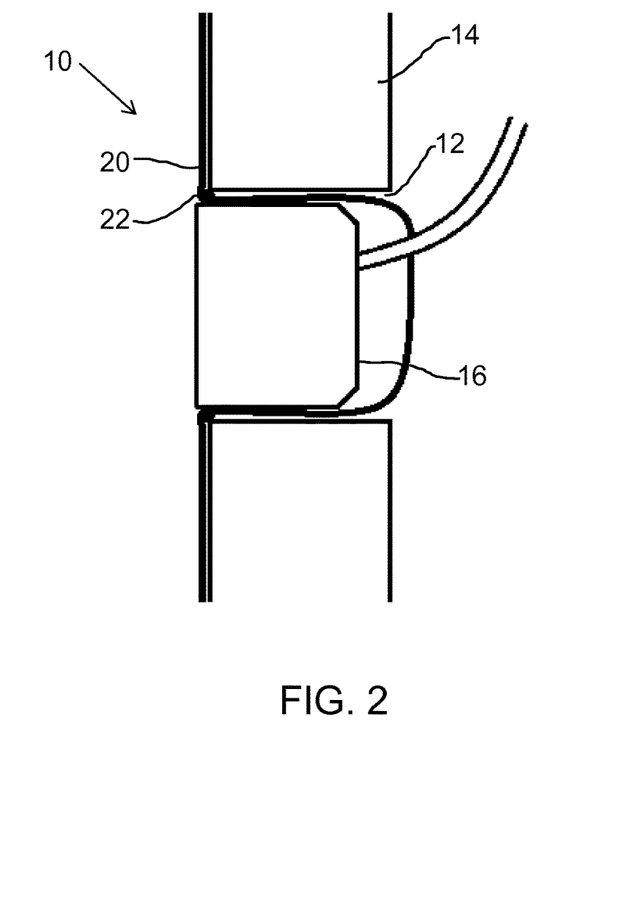
FIG. 2 is a detailed side elevation view in section of a building penetration.

Referring to FIGS. 1 and 2, weather barrier 10 is designed to be used with building penetrations that have an opening 12 in a building 14, which will generally be in the wall, and a utility 16 positioned in opening 12. Utility 16 may take various forms, and is intended to include any supply line, tubing, utility box, or other component that is intended to connect services. As utility 16 may have various cross-sectional shapes, such as round, rectangular, octagonal, etc., it will be understood that weather barrier will be shaped accordingly.

Figure 3:
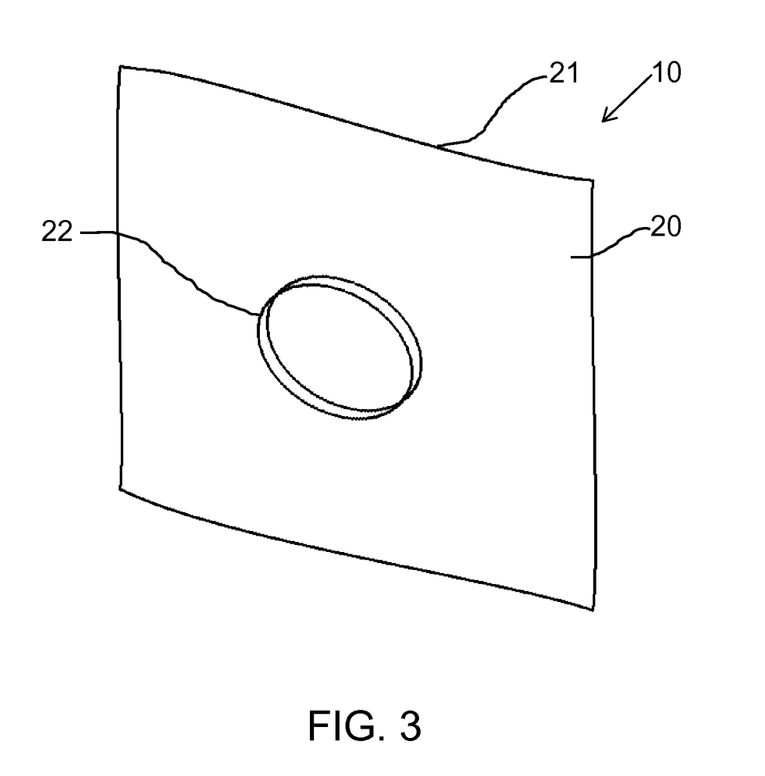
FIG. 3 is a perspective view of a weather barrier.

Referring to FIG. 3, weather barrier 10 has a sheet of non-elastic material 20 that is flexible, water resistant and non-resilient. Sheet of material 20 is preferably made from a building wrap material, such as Tyvek™ that is breathable as well as water resistant, tar paper, or the like. This type of material is generally non-resilient and cannot be stretched to any appreciable degree or without damage.

A resilient seal 22 is attached to sheet of material 20 within its outer perimeter 21 such that sheet of material 20 extends out around resilient seal 22. Referring to FIG. 2, resilient seal 22 is sized to resiliently clamp about utility 16 such that resilient seal 22 seals against and is supported by utility 16 when installed. When installed, sheet of material 20 extends out around utility 16 and is large enough to cover opening 12. Sheet of material 20 can then be overlapped with the building wrap 18 on the rest of building 14 as part of the building envelope, as shown in FIG. 1.

Depending on the type of penetration, sheet of material 20 may form a pocket within the inner perimeter of resilient seal 22, such as to surround an electrical box as shown in FIG. 2, or an opening, such as to surround a pipe or other tubular body as shown in FIG. 1.

Figure 5:
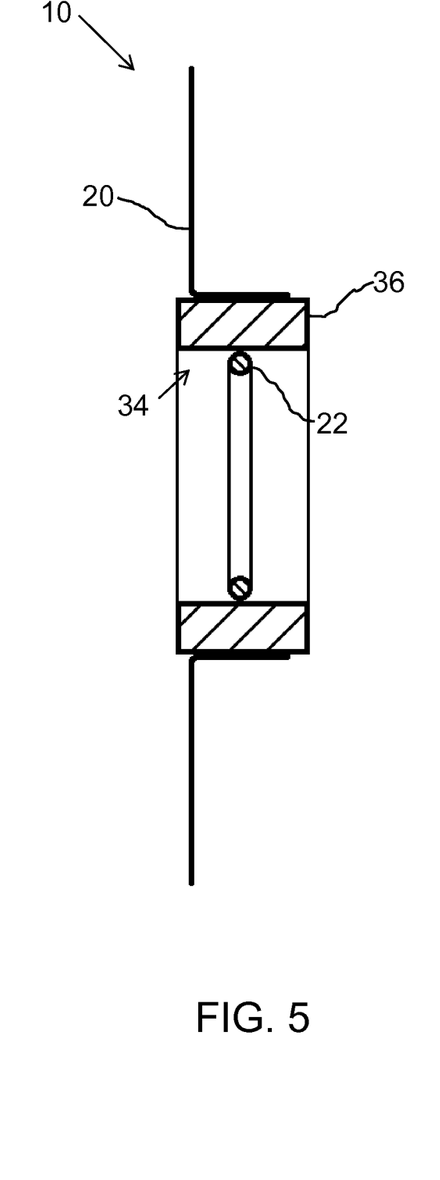
Figure 6:
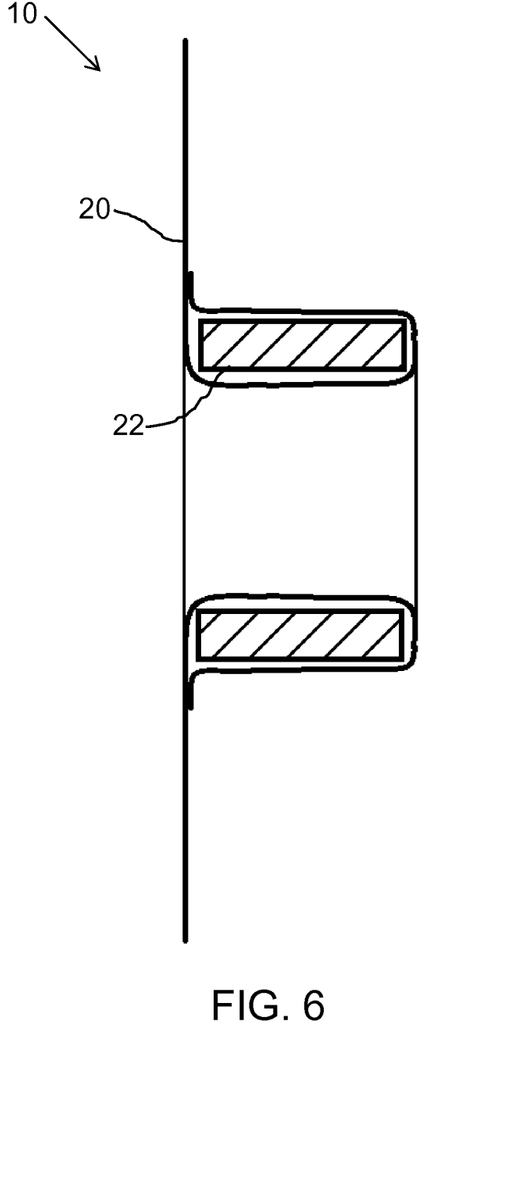
Figure 9:
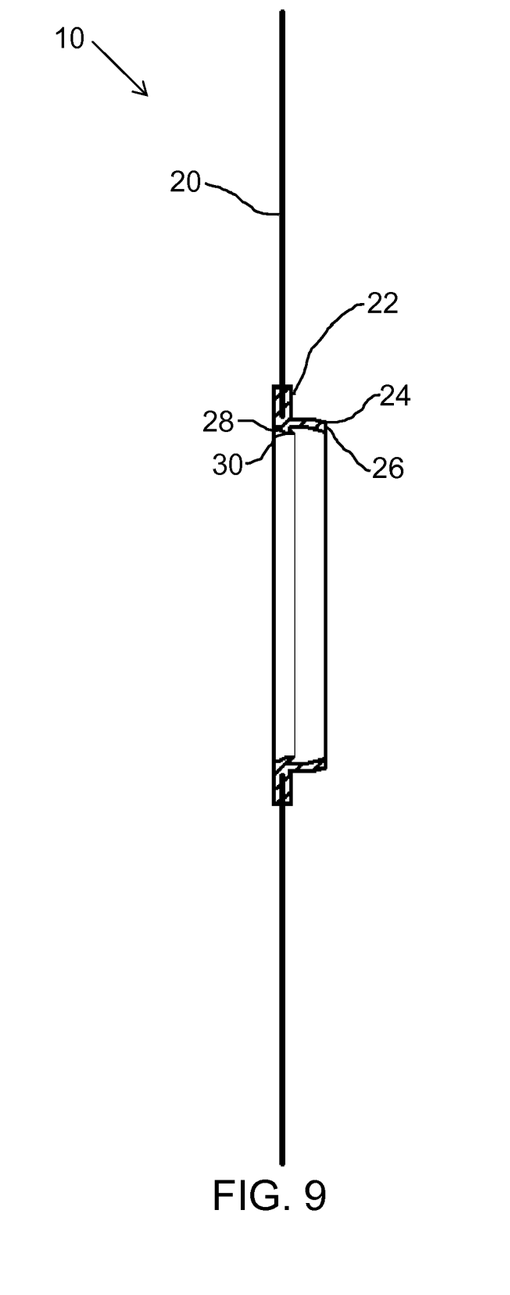
FIGS. 9-11 are side elevation views in section of alternative resilient seals.
Figure 10:
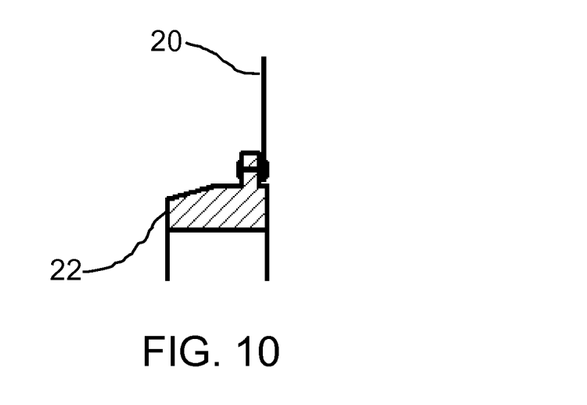

Resilient seal 22 may be attached to sheet of material 20 in various ways. For example, referring to FIG. 9, resilient seal 22 may be molded, such as by injection or compression molding, onto sheet of material 20. Sheet of material 20 may also be adhered to resilient seal 22 as shown in FIG. 5, sewn as shown in FIG. 6 or pin connected or riveted, as shown in FIG. 9. Other methods will also be apparent. When an adhesive or sewing is used, it may be desirable to wrap material 20 around resilient seal 22 as shown in FIG. 6. As sheet of material 20 does not stretch, some excess material may be required to allow resilient seal 22 sufficient room to stretch, depending on the design.

Figure 4:
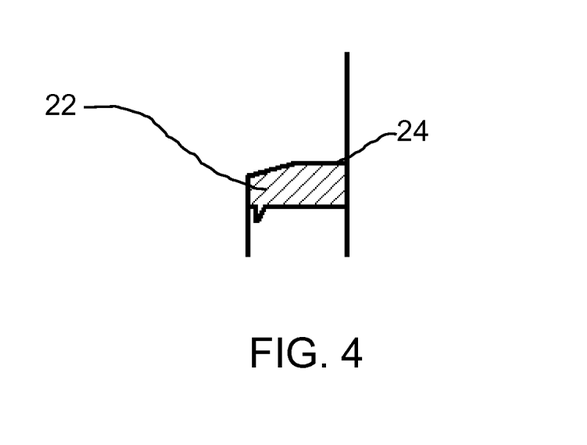
FIGS. 4-6 are side elevation views in section of weather barrier variations.

Referring to FIG. 4, in order to seal against utility 16, resilient seal 22 may have a first seal portion 24 that extends toward the center of resilient seal 22. First seal portion 24 has a first seal surface 26 that engages utility 16 when installed. As shown, first seal portion 24 is in the form of a sealing lip, and extends in from a larger body of resilient seal 22. Referring to FIG. 9, first seal portion 24 is angled out of the plane of resilient seal 22. When installed, this may extend inward into opening 12. As shown, resilient seal 22 also has a second seal portion 28 with a second seal surface 30 that extends toward a center of the resilient seal. Second seal surface 30 is spaced from first seal surface 26 such that first and second seal portions 26 and 30 are separated and form a double seal against utility 16 when installed. By doing so, the possibility of liquid entering through opening 12 is significantly reduced.

Figure 7:
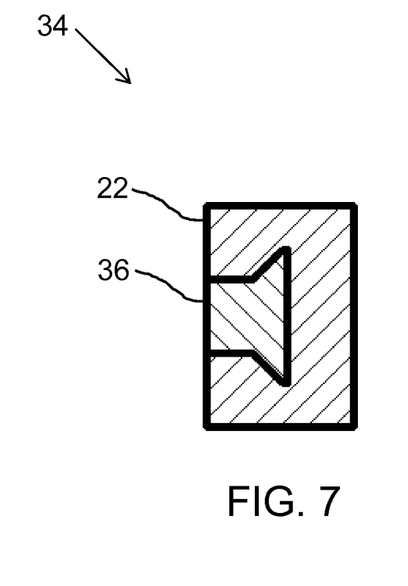
FIGS. 7 and 8 are side elevation views in section of resilient seals.
Figure 8:
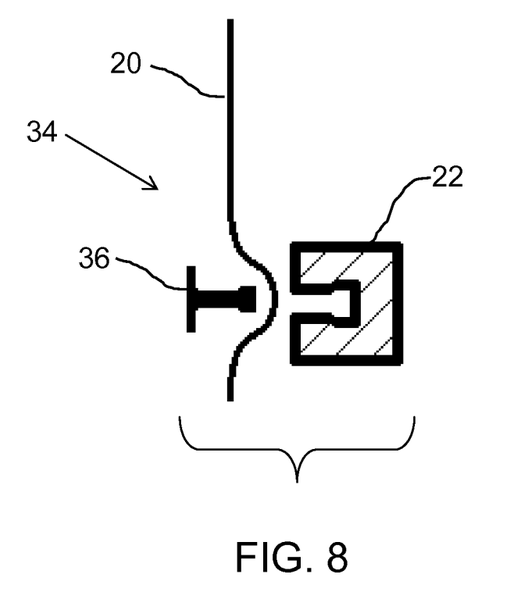
Figure 11:
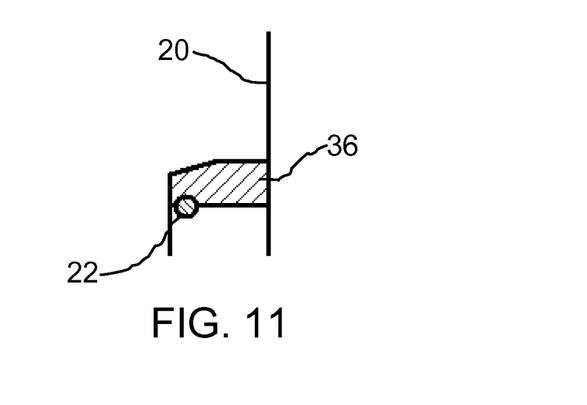

Referring to FIGS. 7 and 8, in some circumstances, resilient seal 22 may be part of a composite seal 34, or in other words, a multi-component seal. Composite seal 34 may include a second part 36 as shown. Second part 36 may be rigid or merely a different material, such as to provide more structural support or other desired properties to composite seal 34. Resilient seal 22 and second part 36 may be molded together, as shown in FIG. 7 or 11, or may be separably connected in a mating arrangement, as shown in FIG. 8, or may be carried by friction, as shown in FIG. 5. If separably connected as in FIG. 8, resilient seal 22 and second part 36 may be used to retain sheet of material 20 between resilient seal 22 and second part 36. This allows sheet of material 20 to be customized immediately prior to use or installation, if desired.

Referring to FIG. 1, resilient seal 22, or composite seal 34 as the case may be, may be sized to fit between an inner edge of opening 12 and an outer edge of utility 16 in opening 12, such that it is not disruptive to the installation of other components on building 14.

Alternative Embodiment

Referring now to FIGS. 12 through 15, an alternative embodiment for a weather barrier is shown, indicated generally by reference number 100.

Figure 12:
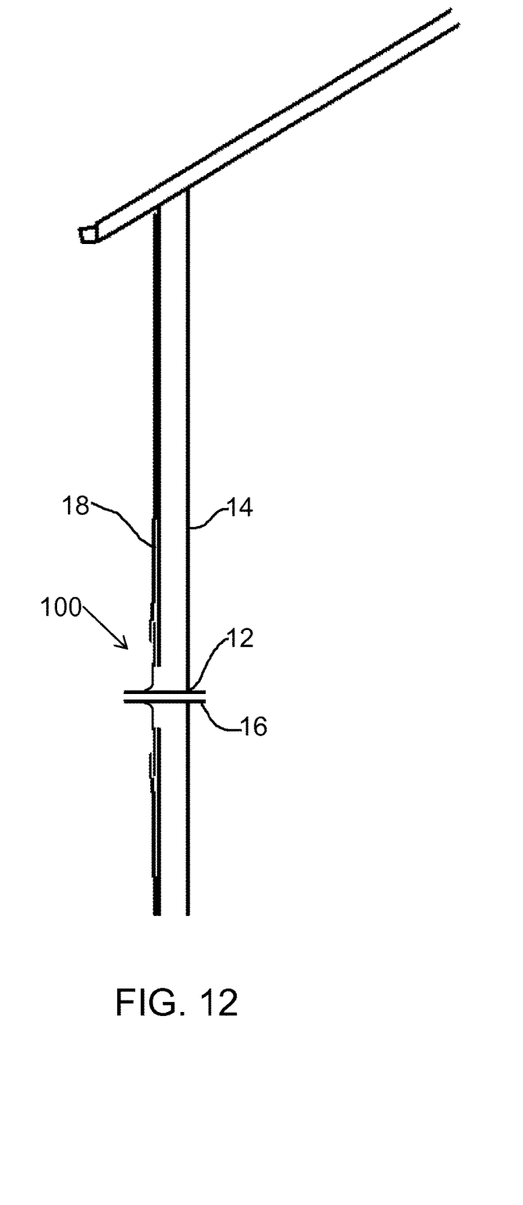
FIG. 12 is a side elevation view in section of a building with an alternative weather barrier.
Figure 14:
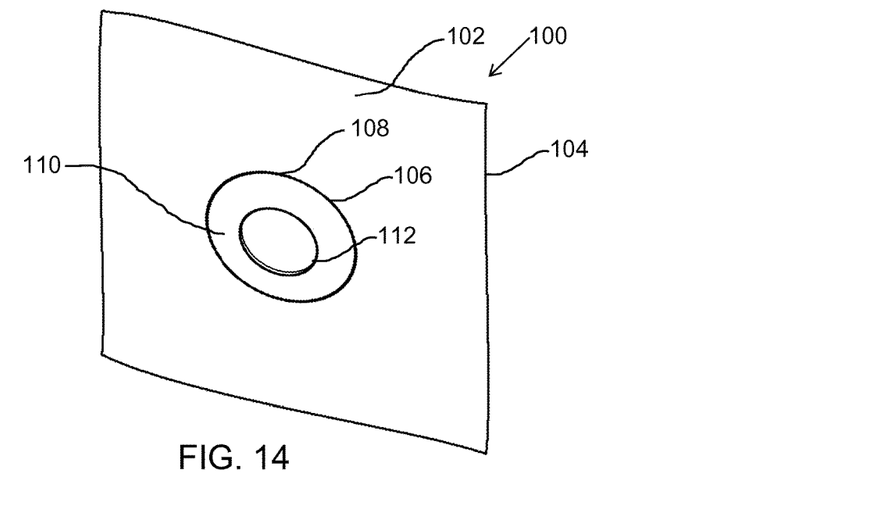
FIG. 14 is a perspective view of the alternative weather barrier.

Referring to FIG. 12, weather barrier 100 is used to for a penetration that defines an opening 12 in a building 14, which will generally be in the wall, and a utility 16 in opening 12. As will be understood from the discussion below, weather barrier 100 may be installed in a similar fashion to weather barrier 10 discussed above. Referring to FIG. 14, weather barrier 100 has a sheet of non-elastic material 102 and a sheet of elastomeric material 110. Sheet of material 102 has an outer perimeter 104 and an inner perimeter 106. Inner perimeter 106 defines a central passage 108 that is larger than an outer diameter of utility 16. Sheet of elastomeric material 110 is sealably attached to sheet of non-elastic material 102 at inner perimeter 106, where sheet of elastomeric material 110 extends inward from inner perimeter 106 and defines a central opening 112 that is smaller than the outer diameter of utility 16.

Figure 13:
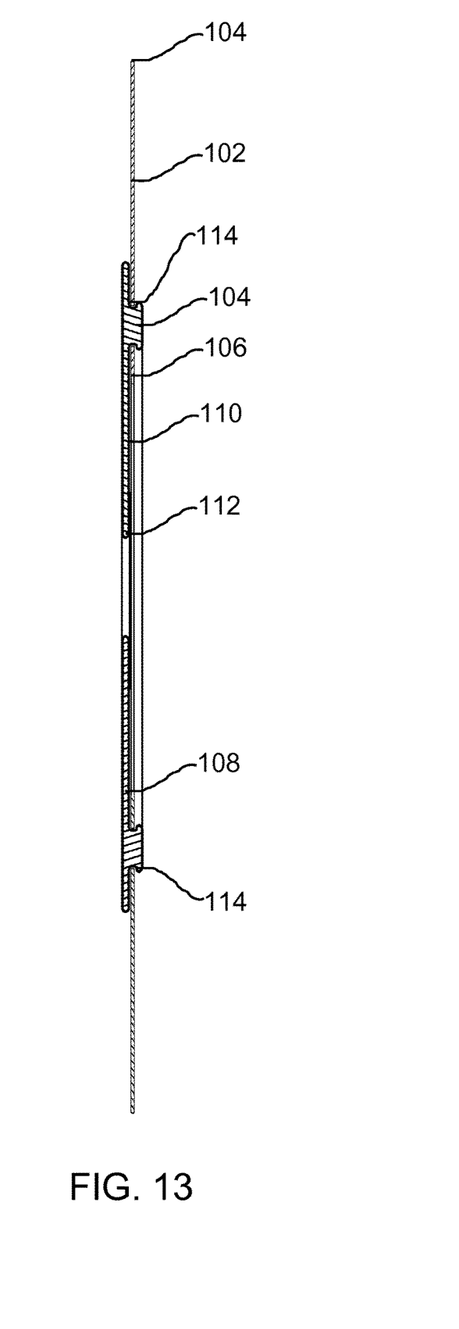
FIG. 13 is a detailed side elevation view in section of the alternative weather barrier of FIG. 12.

Sheet of non-elastic material 102 is flexible, water resistant, and air permeable, such as Tyvek™, and sheet of elastomeric material 110 is capable of forming a seal on utility 16. Preferably, sheet of elastomeric material 110 is an elastomer or rubber-like material that is sufficiently thin to be flexible and deformable without losing its structural integrity. For example, sheet of elastomeric material 110 may be moldable rubber or other similar material that is a few millimeters thick or less, depending on the strength and modulus of elasticity of the selected material. Referring to FIG. 13, sheets of non-elastic and elastomeric material 102 and 110 are sufficiently flexible that, when disposed in a flat position, sheet of non-elastic material 102 defines a plane and sheet of elastomeric material 110 is parallel to and in line with the plane of sheet of material. Sheets 102 and 110 are also sufficiently thin and flexible to be easily manipulated by hand in various shapes, as is known for sheets of weatherproofing material and rubber sheets.

Sheet of elastomeric material 110 may be attached to sheet of non-elastic material in various ways, some of which are discussed above. Referring to FIG. 13, a preferred method includes molding elastomeric material that forms sheet 110 onto non-elastic sheet 102. This may be done, for example, by forming holes or slots 114 in non-elastic sheet 102 that elastomeric material is injected through to form an integral rivet-type connection, as shown.

Referring to FIGS. 12 and 13, sheet of elastomeric material 110 preferably has a uniform thickness as it extends inward from inner perimeter 106, although other designs may also be used, such as a ribbed shape with concentric circles, etc. Preferably, sheet of elastomeric material 110 is designed to properly seal against utility 16 when installed and opening 112 is sized to permit this. In some circumstances, opening 112 may be significantly smaller than utility 16, or may be only slightly smaller than utility 16, depending on the type of material selected. However, opening 112 will preferably be sized to appropriately engage and seal against utility 16. As can be seen in FIG. 12, sheet of elastomeric material 110 will generally curve outward as it engages and is pushed over utility 16.

Figure 17:
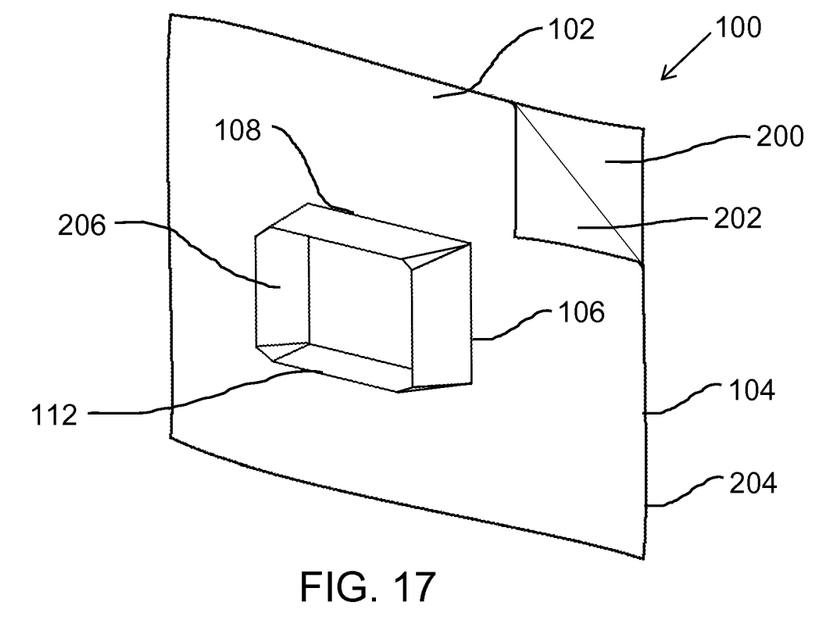
FIG. 17 is a perspective view of the alternative weather barrier of FIG. 16 with a utility cover.

Referring to FIG. 14, central passage 108 is circular as is central opening 112. Other shapes may be used, depending on the intended use and the shape of utility 16, which may or may not match the shape of central passage 108 and central opening 112. For example, a material with an appropriately selected modulus of elasticity may be designed to suit various shapes. Referring to FIG. 17, central passage 108 may, for example, be rectangular. Preferably, weather barrier 100 will be designed to minimize unnecessary stresses. Sheet of elastomeric material 110 may also be replaced by a utility cover 206 as shown in FIG. 17. Utility cover 206 may be a rigid plastic cover sized to fit closely over the utility 16 such that water does not enter through opening 112 in utility cover 206.

Figure 15:
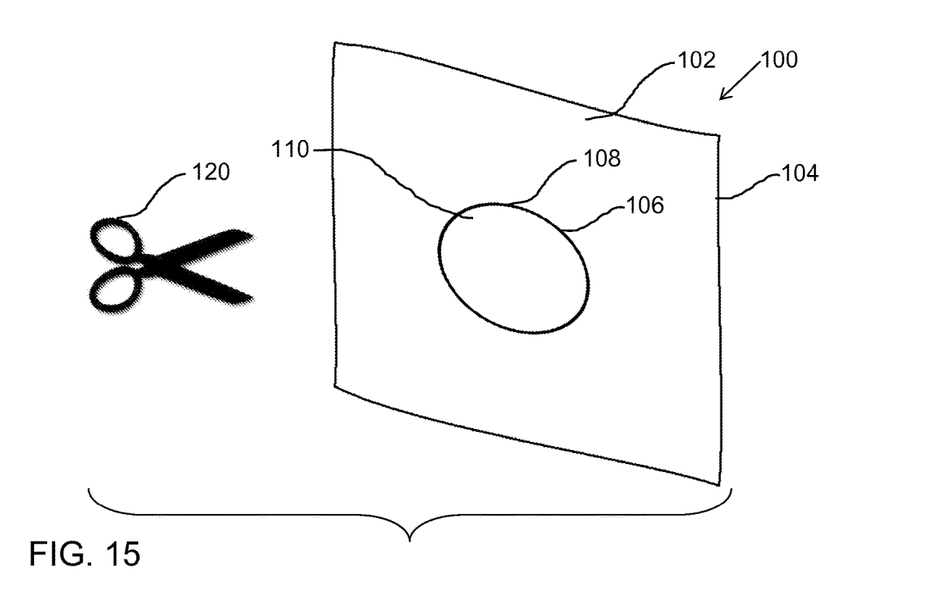
FIG. 15 is a perspective view of the alternative weather barrier without a central opening.

Referring to FIG. 15, weather barrier 100 may be provided to an installer without a central opening 112. In this situation, the installer is intended to form an appropriately sized central opening 112 that will fit the size of utility 16. This may be done using an appropriate hand tool, such as a punch with various sizes of dies, a knife with a template to guide the knife, various other cutting implements, guide lines for various sizes of holes for opening 112 marked or printed on elastomeric material 110, etc. The various cutting tools that may be used are represented by scissors 120. This approach allows an installer to have the necessary materials without having to know the exact sizes of utilities 16 that will be encountered.

Figure 16:
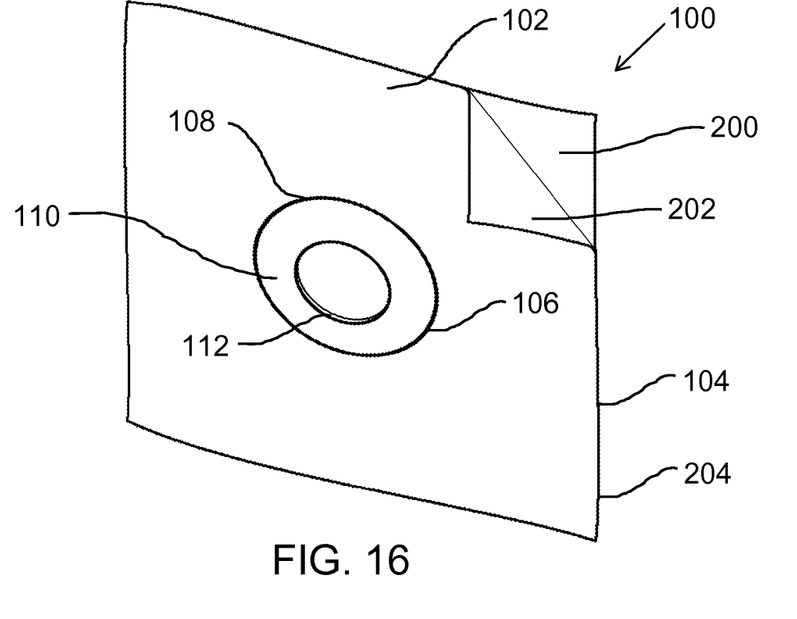
FIG. 16 is a perspective view of an alternative weather barrier with a self-adhesive layer.

Referring to FIGS. 16 and 17, sheet of non-elastic material 102 may also be self-adhesive. As shown, sheet of non-elastic material 102 has a removable layer 200 that can be pulled away from the other layers of sheet of non-elastic material 102 to expose an adhesive layer 202. Sheet of non-elastic material 102 may also have a backing layer 204 which may be a material such as Tyvek™, or may be other flexible, water resistant materials such as a thin layer of plastic or other polymer. Sheet of non-elastic material 102 may be installed by removing layer 200 and adhering sheet of non-elastic material 102 to a wall, building wrap material, or other surface.

Figure 18:
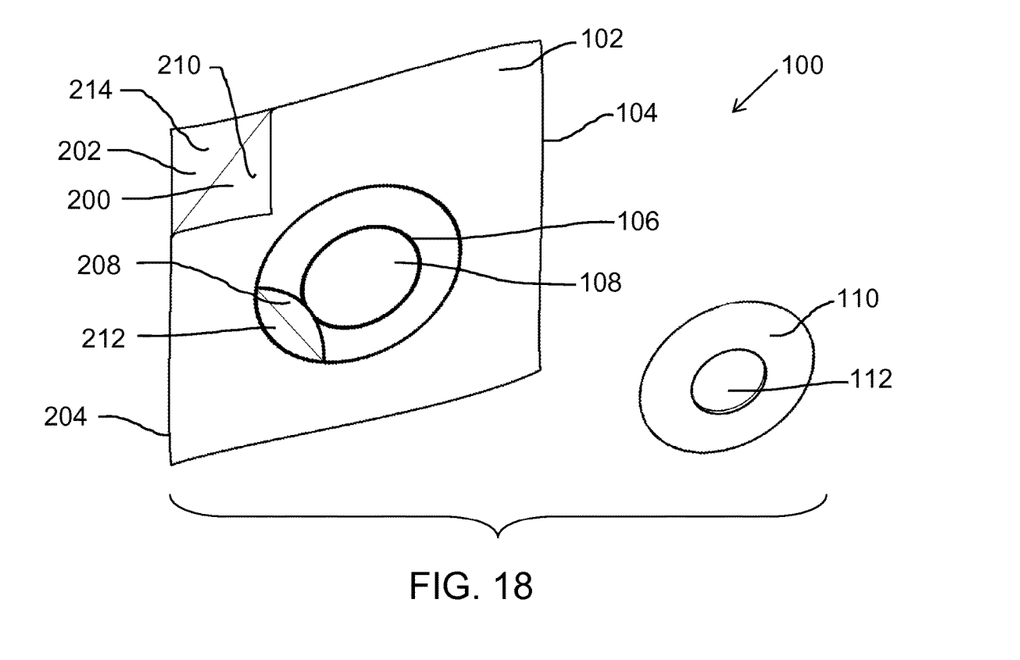
FIG. 18 is a perspective view of an alternative weather barrier with a self-adhesive layer having two removable layer portions.
Figure 19:
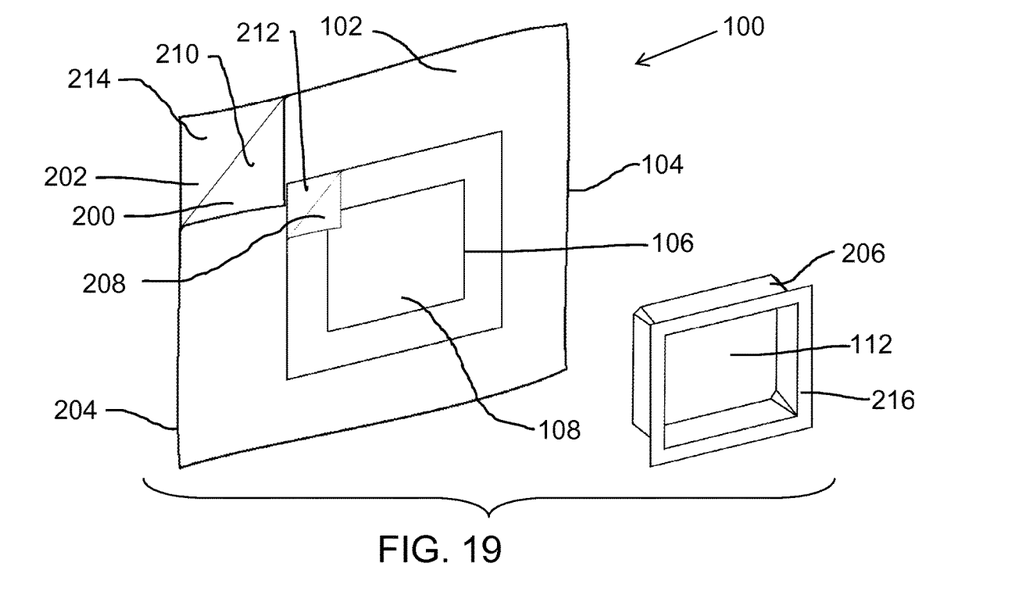
FIG. 19 is a perspective view of an alternative weather barrier with a self-adhesive layer having two removable layer portions and a utility cover.

Referring to FIG. 18, and FIG. 19, sheet of non-elastic material 102 may be protected by multiple portions of removable layer 200, for example, that allow the adhesive layer to attach to both the sheet of elastomeric material 110 or utility cover 206 and a wall or other surface. Removable layer 200 may have an inner portion 208 that can be removed separately from the outer portion 210 to expose inner portion 212 of adhesive layer 202 without exposing outer portion 214 of adhesive layer 202. Preferably, inner portion 208 is sized to accommodate the size of elastomeric material 110 or other type of utility cover, such that it may be installed by a user without exposing the entire area of adhesive layer 202. Removable layer 200 may also be divided into other section that allow ease of installation, such as a removable portion that is split into sections that allow it to be removed after installed on a penetration. Other variations will be apparent to those skilled in the art.

Figure 20:
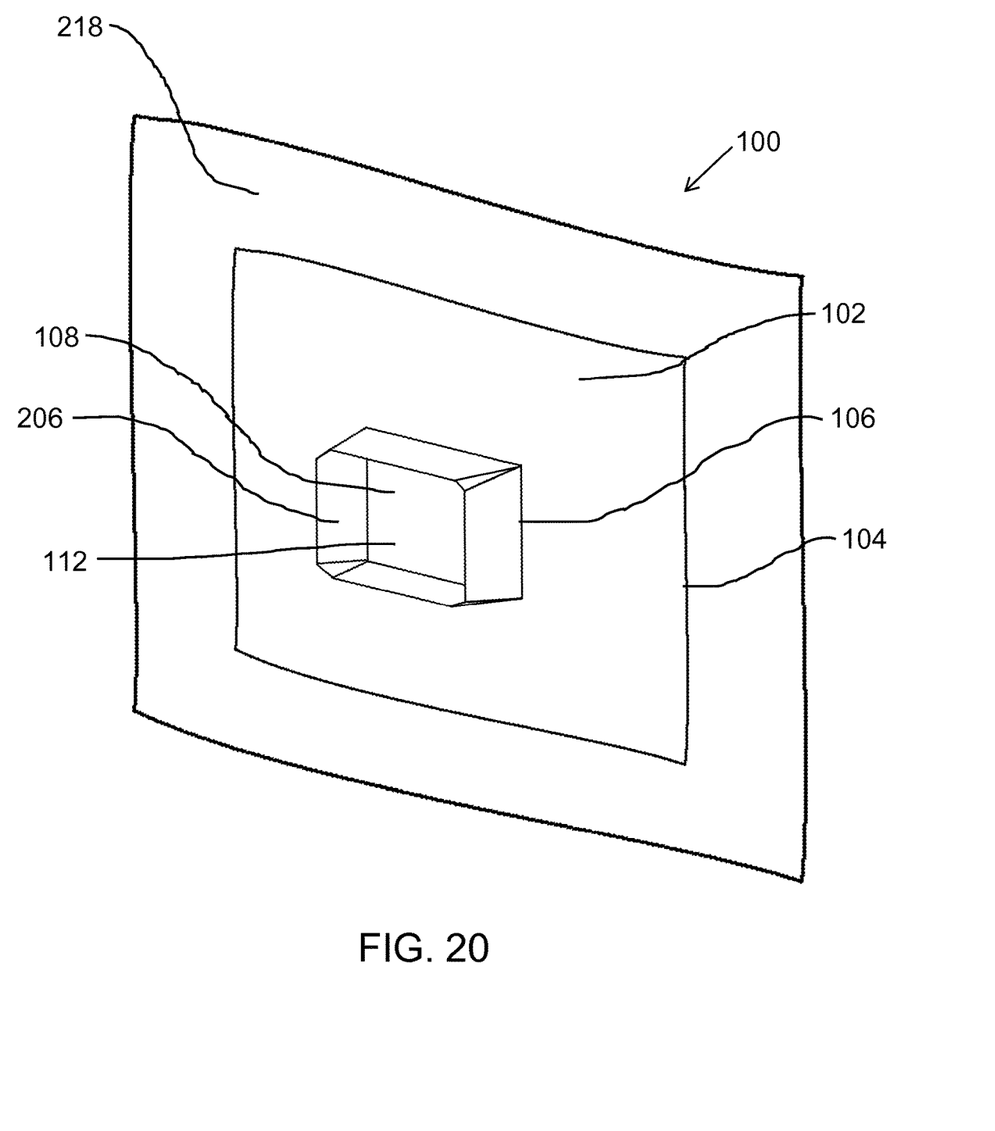
FIG. 20 is a perspective view of an alternative weather barrier with a self-adhesive layer attached to a rubber sheet.

When used with utility cover 206, as shown in FIG. 19, utility cover carries flange 216, allowing utility cover 206 to be attached to inner portion 212 of adhesive layer 202. It will be understood by those skilled in the art that removable layer 200 may have a variety of removable portions in a variety of shapes depending on the application. For example, the outer portion 210 may be two portions that can be removed separately to aid in positioning the sheet of non-elastic material. Sheet of non-elastic material 102 may be installed by removing inner portion 208 of removable layer 200, adhering sheet of elastomeric material 110 or utility cover 206 to inner adhesive portion 212, positioning sheet of non-elastic material 102, and removing outer portion 210 and adhering sheet of non-elastic material 102 to a wall, building wrap material, or other surface. Referring to FIG. 20, sheet of non-elastic material 102 may also be adhered to a rubber sheet 218. As it is difficult to apply tape or other adhesive to rubber, sheet of non-elastic material 102 provides an attachment surface for rubber sheet 218 to be attached to a wall or other surface. For example, rubber sheet 218 may be attached to sheet of non-elastic material 102, and then inserted between a wall and a layer of building wrap material. The sheet of non-elastic material 102 may then be taped to the building wrap material, such that the rubber sheet 218 is held in place.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of protecting a penetration in a building against weather, the penetration comprising an opening in a wall of the building and a utility that passes through the opening, the method comprising the steps of:
    providing:
        a sheet of non-elastic material, the non-elastic material being flexible and water resistant, the sheet of non-elastic material having an outer perimeter and an inner perimeter, the inner perimeter defining a central passage that is larger than an outer diameter of the utility; and
        a utility cover comprising a non-pliable sleeve and a flange extending perpendicularly outward from the non-pliable sleeve, wherein the flange of the utility cover is parallel to and sealably attached to the sheet of non-elastic material at the inner perimeter, the non-pliable sleeve of the utility cover extending outward from the inner perimeter of the sheet of non-elastic material and from the flange in a direction that is perpendicular to the plane of the sheet of non-elastic material, wherein the non-pliable sleeve defines a central opening that is shaped to receive the outer diameter of the utility; and
    placing the utility cover over the utility such that the central opening of the non-pliable sleeve receives the outer diameter of the utility and such that the sheet of non-elastic material is adjacent to the wall of the building; and
    attaching a building wrap material and the sheet of non-elastic material to the wall of the building.

2. The method of claim 1, wherein the utility cover is molded to the sheet of non-elastic material.

3. The method of claim 1, wherein the sheet of non-elastic material is air permeable.

4. The method of claim 1, wherein attaching the building wrap material and the sheet of non-elastic material comprises attaching in an overlapping fashion.

5. The method of claim 1, wherein the sheet of non-elastic material comprises a self-adhesive layer having a building-adhering area protected by a removable cover and a cover-adhering area.

6. The method of claim 5, wherein attaching the building wrap material and the sheet of non-elastic material comprises attaching the self-adhesive layer to the building wrap material and at least one of the wall and the utility such that a seal is formed between the building wrap material and the utility.

7. The method of claim 5, wherein the cover-adhering area is protected by a second removable cover, and further comprising the step of removing the second removable cover and adhering the utility cover to the cover-adhering area.

8. The method of claim 1, wherein the utility cover passes through the sheet of non-elastic material such that the flange is attached to a first side of the sheet of non-elastic material and the sleeve extends outward from a second side of the sheet of non-elastic material.

9. A kit for forming a weather barrier for a penetration in a building, the penetration comprising an opening in a wall of the building and a utility that passes through the opening, the kit for forming a weather barrier comprising:
    a sheet of material that is flexible and water resistant, the sheet of material having an outer perimeter and an inner perimeter, the inner perimeter defining a central passage that is larger than an outer diameter of the utility;
    a self-adhesive layer on a face of the sheet of material, the self-adhesive layer having a building-adhering area protected by a first removable cover and a cover-adhering area protected by a second removable cover and surrounded by the building-adhering area; and
    a utility cover comprising a non-pliable sleeve and a flange extending perpendicularly outward from the non-pliable sleeve, the flange of the utility cover comprising a surface for sealably adhering to the cover-adhering area after removal of the second removable cover, the non-pliable sleeve of the utility cover being shaped to extend outward from the inner perimeter of the sheet of material in a direction that is perpendicular to the plane of the sheet of material and defining a central opening, wherein the non-pliable sleeve is shaped to receive the outer diameter of the utility when adhered to the cover-adhering area.

10. The kit of claim 9, wherein the utility cover passes through the sheet of material such that the flange is attached on the face of the sheet of material, and the sleeve extends outward from a second face of the sheet of material.

* * * * *